United States Patent [19]

Marrero

[11] 3,789,305

[45] Jan. 29, 1974

[54] TONE BURST TO FREQUENCY CONVERTER

[75] Inventor: Michael T. Marrero, San Diego, Calif.

[73] Assignee: The United States of America as represented by the Secretary of the Navy, Washington, D.C.

[22] Filed: Aug. 28, 1972

[21] Appl. No.: 284,314

[52] U.S. Cl. .................................. 328/140, 328/136

[51] Int. Cl. .................................................. H03d 3/04

[58] Field of Search ........................ 328/37, 136, 140

[56] References Cited

UNITED STATES PATENTS

| | | | |
|---|---|---|---|
| 3,605,026 | 9/1971 | Bowden | 328/37 X |
| 3,648,180 | 3/1972 | Woodcock | 328/37 X |
| 3,657,658 | 4/1972 | Kubo | 328/37 X |
| 3,663,885 | 5/1972 | Stewart | 328/140 |
| 3,670,151 | 6/1972 | Lindsay et al. | 328/37 X |

*Primary Examiner*—John S. Heyman

*Attorney, Agent, or Firm*—R. S. Sciascia; J. W. Pease; J. F. Miller

[57] ABSTRACT

Circuitry in a sonar simulator training device for detecting and reproducing the carrier frequency of a tone burst signal. The carrier is a sinusoid which may be frequency modulated with a linear FM signal (linear slide). The invention measures the frequency and period of the carrier frequency of an incoming tone burst signal, determines whether or not frequency modulation is present, and whether or not the FM results in an increase or decrease in carrier frequency (up slide or down slide). The invention generates a square wave output signal having the tone burst carrier frequency and provides means for generating an up slide or a down slide in the output signal.

6 Claims, 3 Drawing Figures

TONE BURST TO FREQUENCY CONVERTER

BACKGROUND OF THE INVENTION

In certain sonar simulating devices useful for training purposes the frequency and the rate and sense of change of frequency of an incoming signal must be determined. For various reasons none of the prior art expedients tried have been wholly successful. Among the problems of the prior art are those involving circuit complexity, size, weight, accuracy, and reliability. The present invention solves these problems by accurately detecting and analyzing an incoming signal, and generating a square wave output signal which reproduces the frequency and FM characteristics of the incoming signal.

SUMMARY OF THE INVENTION

The invention utilizes a pair of pulse isolating circuits for sampling an incoming tone burst carrier frequency, the second sample being delayed with respect to the first. The isolator outputs are clocked into 400 n sec intervals which are stored in two respective registers. The register counts are compared to determine whether the carrier frequency is constant or changing. Means are provided for generating a square wave output signal having the frequency of the carrier signal and for generating changes of frequency in the output matching any changes in the tone burst carrier frequency.

DESCRIPTION OF THE PREFERRED EMBODIMENT

Figure 1:
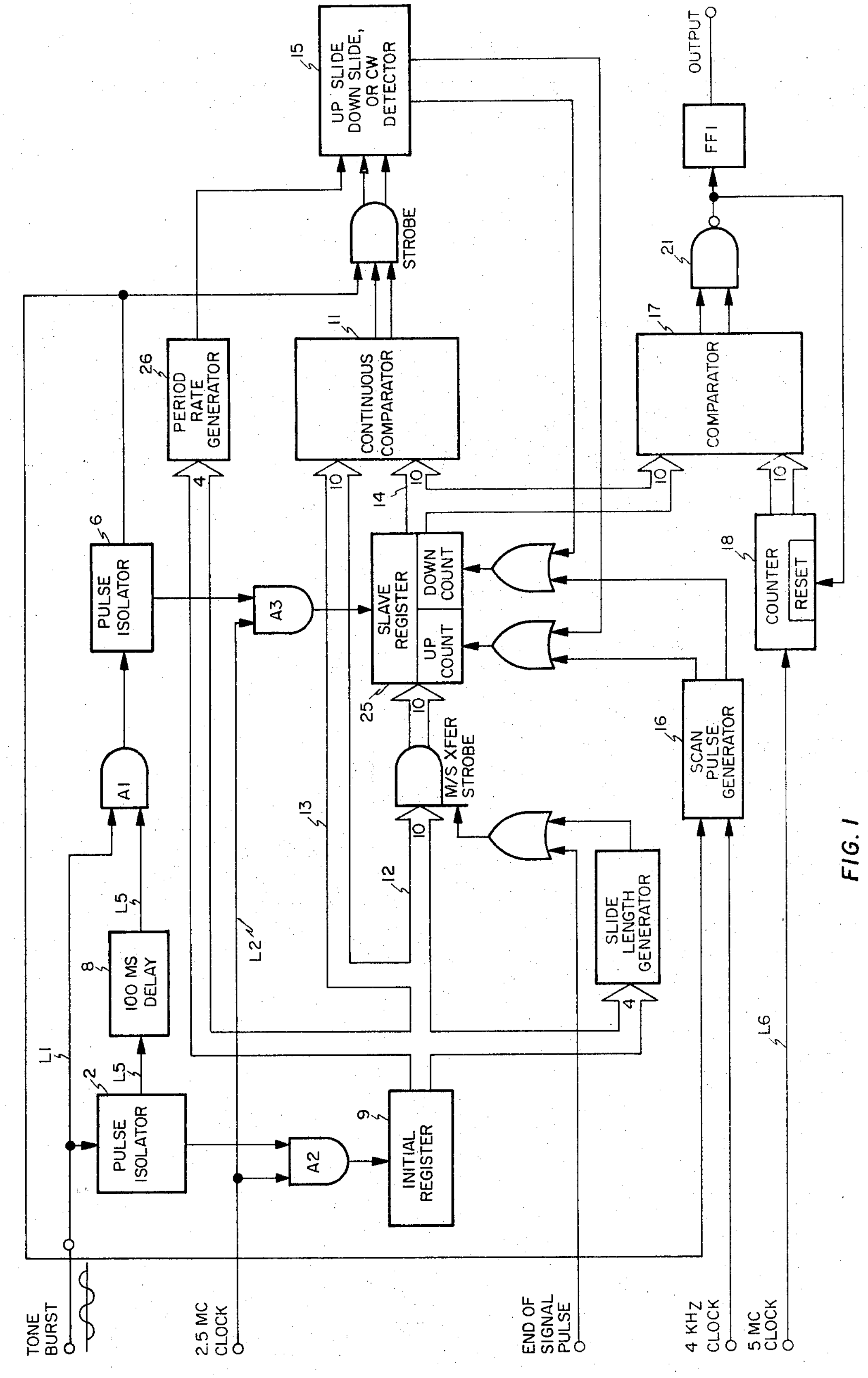
FIG. 1 is a block diagram of the invention.

FIG. 1 is a functional block diagram showing the logic of the invention. An incoming tone burst signal appears on an input line L1. The tone burst may be a frequency modulated sinusoidal carrier frequency. The signal is directed to a pulse isolator 2 and to an AND gate A1. Pulse isolator 2 has an output line L5 connected through a 100 ms delay circuit to an input of AND gate A1. The output of gate A1 goes to a pulse isolator 6 which samples the tone burst carrier signal 100 ms after pulse isolator 2 generates an output signal. The outputs of pulse isolators 2 and 6 are connected to inputs of two respective AND gates A2 and A3. The pulse isolator output signals enable gates A2 and A3 to pass a 2.5 mc clock signal into an "initial" register 9 and a "slave" register 25. Thus the pulse isolator output signals are divided into 400 n sec intervals which are stored in the registers 9 and 25. Since a pulse isolator has an output signal of the same duration as one cycle of the carrier frequency, the register count indicates the period of a carrier cycle. Register 9 begins counting immediately when a tone burst is received and register 25 begins counting 100 ms later.

The initial register 9 has its read-out terminals connected to respective input terminals of a continuous comparator 11 by multi-lead cables 12 and 13. Slave register 25 has its read-out terminals connected to input terminals of continuous comparator 11 through a multi-lead cable 14. If at any time the counts stored in the initial and slave registers are equal, continuous comparator 11 generates an output signal and an "upslide, downslide, or C.W." (C. W. indicates continuous wave) detector 15 generates a signal. Since there can be an ambiguity of ± 1 count in the counts stored in the initial and slave registers, a scan pulse generator 16 is provided to periodically change the count in the slave register by +2 and then −4 counts. If after the tone burst is sampled, the count in the initial register is greater than the count in the slave register an "up slide" or increase in signal frequency is indicated by detector 15. If the count in the initial register is less than that in the slave register a "down slide" or decrease in signal frequency is indicated by detector 15. A comparator 17 compares the count in slave register 25 with a count in a counter 18 which is derived from a 5 mc clock signal on a line L6. When the two counts in 25 and 18 are equal, comparator 17 forwards a signal to a flipflop FF 1 through a gate 21. Flipflop FF 1 develops a square wave output signal having a frequency equal to the carrier frequency of the tone burst signal.

Figure 2:
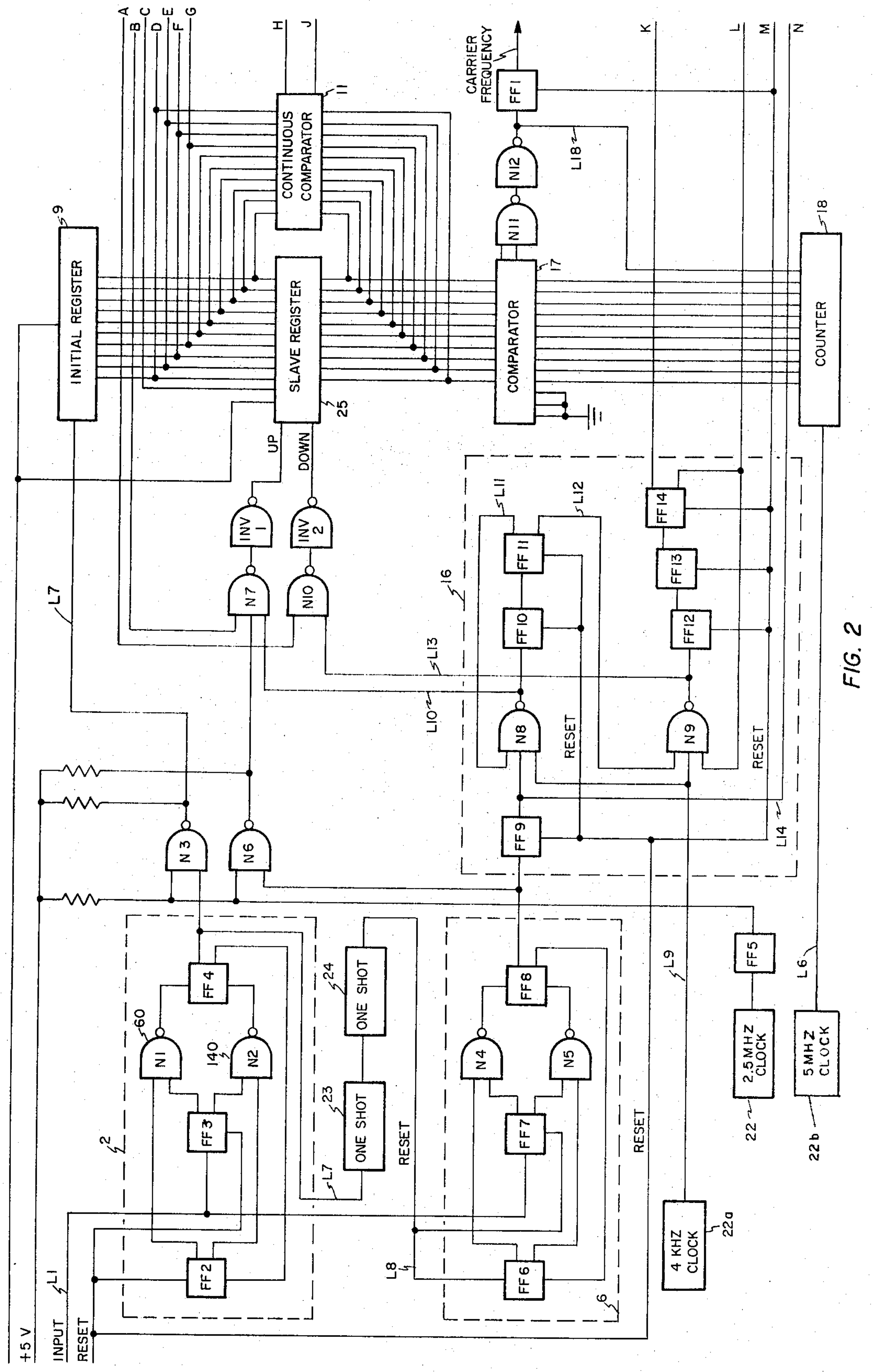
FIG. 2 shows the logical arrangement of the invention.
Figure 3:
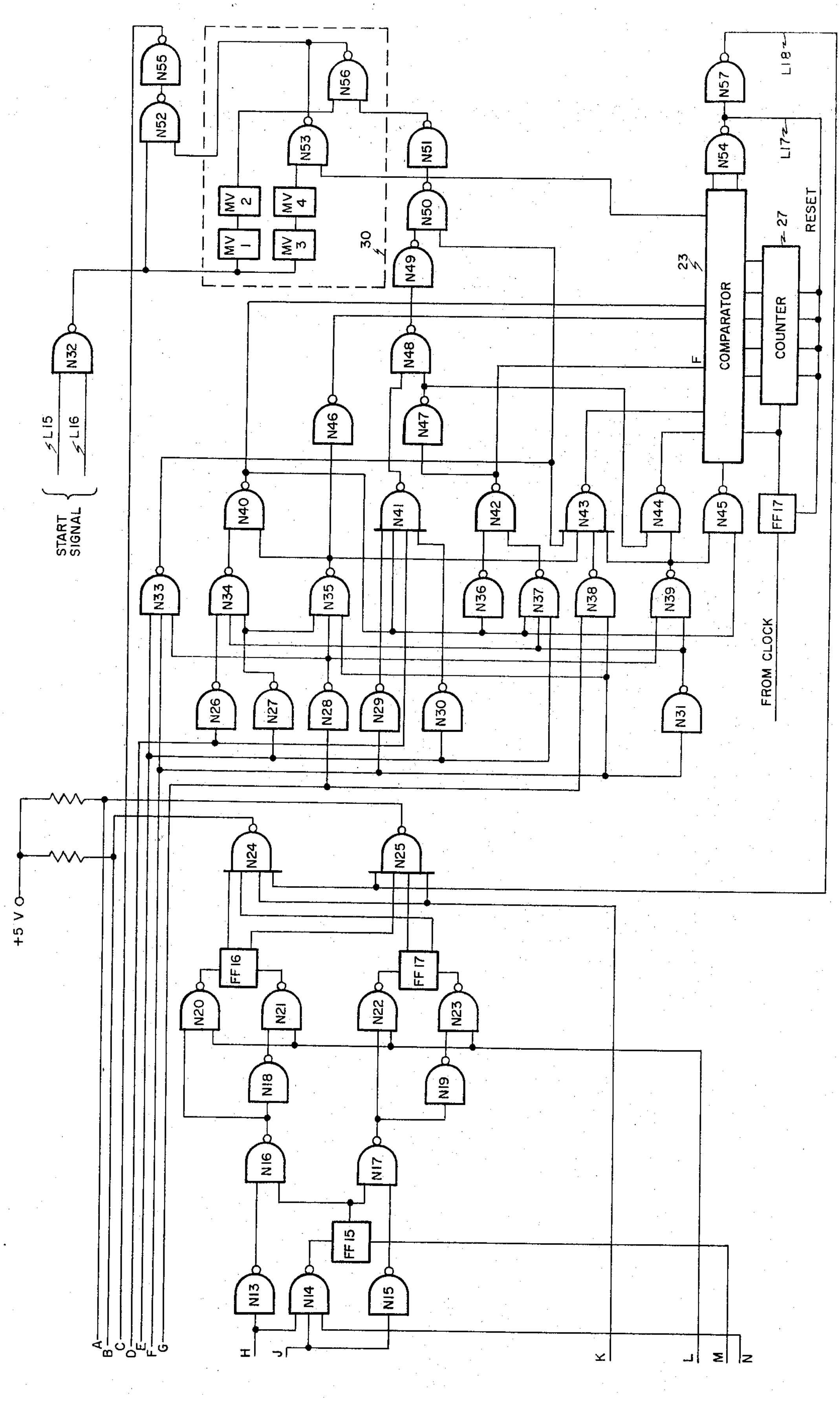
FIG. 3 shows the logic of the up slide-down slide, continuous wave detector 15 of FIG. 1. The apparatus of FIGS. 2 and 3 are connected together by joining the like labeled lines A, B, C, etc.

FIGS. 2 and 3 show the circuitry of the invention in detail. In FIG. 2, pulse isolator 2 is shown to be comprised of flipflops FF 2, FF 3, FF 4, and NAND gates N 1 and N 2 shown enclosed with dash lines. The purpose of pulse isolator 2 is to measure the period of one cycle at the beginning of the tone burst signal received on line L1.

Prior to operation, a reset pulse received on the RESET line shown causes FF 2 to be in a set condition and FF 3 and FF 4 to be in a reset condition. A tone burst signal is then received on line L1. The first peak amplitude in the tone burst will toggle FF 3 which will send a signal through NAND gate N 1 which is enabled by the set condition of FF 2. The output of N 1 will set FF 4 which will send a signal to reset FF 2. This blocks gate N 1. FF 4 when set also sends an output signal to a NAND gate N 3 which then passes a 2.5 mc clock frequency from a clock 22 and a flipflop FF 5 to the input of the initial register 9 over line L7. Register 9 will count the 2.5 mc clock frequency until the second peak amplitude in the incoming tone burst signal resets FF 3. FF 3 sends an output signal through NAND gate N 2 (which is enabled by the reset condition of FF 2) to reset FF 4. This disables gate N 3 so that no more clock pulses are counted by initial register 9. Register 9 now stores a count equal to the number of 400 n sec intervals in a period at the beginning of the incoming tone burst frequency.

FIG. 2 is partially schematic, showing the actual circuitry of the preferred embodiment. Therefore it shows the NAND gates actually used rather than AND gates shown in FIG. 1 to explain the logic of the invention.

Pulse isolator 6 is identical with isolator 2 but does not respond to the incoming tone burst when isolator 2 does because 6 is not placed in condition to do so by the pulse on the RESET line. However, when FF 4 is reset to disable NAND gate N 3, an output signal from FF 4 is applied to a one-shot multivibrator 23 over a line L 7. Multivibrator 23 generates a 100 ms pulse which is applied to another one-shot multivibrator 24. At the end of the 100 ms pulse from 23, one-shot 24 generates a one microsecond pulse which is applied over a line L 8 to set a flipflop FF 6 and reset a flipflop FF 7 (which resets a flipflop FF 8) which with two NAND gates N 4 and N 5 comprises pulse isolator 6. Since isolator 6 has the same structure as isolator 2, when it is actuated 100 ms after 2 is reset, it generates an output pulse equal to the period of the tone burst 100 ms after the period measured by isolator 2. This output pulse enables a NAND gate N 6 to gate the 2.5 mc clock frequency into a slave register 25 (via a NAND gate N 7 and an inverter INV 1). Isolator 6 changes state and disables NAND gate N 6 at the next following peak amplitude in the tone burst signal in the same manner as isolator 2. Initial register 9 now stores a count which is a measure of the period of the tone burst at its inception and register 25 stores a count indicative of the tone burst period 100 ms later.

Comparison of the two counts stored in registers 9 and 25 makes it possible to determine whether or not the tone burst has a constant frequency and whether any change in frequency is "up" or "down," that is increasing or decreasing. The tone burst carrier frequency is a sinusoid and may be frequency modulated with a linear FM signal (referred to as a "linear slide"). In one sonar simulator apparatus with which the invention may be used, a tone burst may have a constant carrier frequency or when the carrier frequency is less than 4.5 KHz with a pulse width of 500 ms, may have a 100 Hz increase in frequency (up slide) or a 100 Hz decrease (down slide). When the tone burst carrier frequency is less than 4.5 KHz with a pulse width of 160 ms, there may be a 440 Hz up slide or a 440 Hz down slide.

If the count stored in the initial register is greater than the count stored in the slave register, an up slide is indicated. If the count in the initial register is less than the count stored in the slave register, a down slide is indicated. If both registers store the same count, no FM modulation of the carrier signal is present and a pulsed continuous wave case is indicated.

Difficulties occur in detecting the C.W. case when the counts in both registers should be equal because either or both registers could have an error of +1 or −1 count. Therefore, the scan pulse generator 16 (FIG. 1) is provided to add two counts to the slave register, then subtract four counts so that if the stored counts should in fact be equal, then at some time during the addition or subtraction of scan pulses the counts will be found equal by the comparator 11.

Scan pulse generator 16 is comprised of flipflops FF 9, FF 10, FF 11, FF 12, and FF 13, and NAND gates N 8 and N 9. The flipflops are initially reset by the reset pulse on the lines shown. The output pulse from pulse isolator 6 toggles flipflop FF 9 which then applies an output signal to NAND gate N 8 which passes pulses from a 4 KHz clock 22*a* over lines L 9 and L10 to the upcount input of slave register 25 through NAND gate N 7 and an inverter INV 1. The same pulses are fed to a two-stage binary counter comprised of flipflops FF 10 and FF 11. On receipt of the second pulse FF 11 is set and feeds back an output signal over a line L 11 to close gate N 8 and a signal over line L 12 to open gate N 9. Gate N 9 then passes pulses from clock 22*a* over a line L 13 to the down count input of slave register 25 through a NAND gate N 10 and inverter INV 2. Gate N 9 also passes the 4KHz clock pulses to a three-stage binary counter comprised of flip-flops FF 12, FF 13 and FF 14. When the fourth pulse is received FF 14 generates an output signal which is fed back over a line L 14 to close gate N 9. The scan pulse generator has now completed its function of adding two, then subtracting four, from the count stored in the slave register.

The counts stored in registers 9 and 25 are applied to continuous comparator 11 through the connections shown. Comparator output leads H and J will be high and low or 1 and 0 if the register 9 count is greater, 0 and 1 if the register 25 count is greater, and 1 and 1 when the register counts are equal. The comparator output signals are forwarded to two flipflops FF 16 and FF 17 via NAND gates N 20, N 21, N 22, and N 23 (FIG. 3) at the end of the scanning process. The end of the scanning process is indicated by the output signal from flipflop 14 in the scan pulse generator 16 of FIG. 2.

At the end of the scanning process, the outputs of the continuous comparator are to be stored into FF 16 and FF 17. This is done by passing outputs H and J through inverters N 13 and N 15 and gating through N 16 and N 17. FF 15 is reset by the reset pulse before the beginning of the operation so that it passes the comparator information. The information is then jam transferred in FF 16 and FF 17 by NAND gates N 20 – N 23. The transfer signal occurs at the end of the scanning process from FF 14. NAND gate N 14 is kept open during the scanning operation by a signal from FF 9. If at any time during the scanning process the comparator 11 indicates equals ($H = 1, J = 1$), NAND gate N 14 will reset FF 15. This closes NAND gates N 16 and N 17 and when a transfer pulse is applied to NAND gates N 20 – N 23, FF 16 and FF 17 are both placed in the set condition which is the C.W. indication. The correct information is now stored in FF 16 and FF 17.

The elements shown in FIG. 3 comprise the up slide, down slide, or C.W. detector shown in box 15 in FIG. 1. The NAND gates N 26 – N 31, and N 33 – N 50, comprise a period rate generator shown as box 26 in FIG. 1. The four most significant digits of the count stored in initial register 9 of FIG. 2 are applied to the NAND gates comprising the period rate generator in FIG. 3 over leads D, E, F, and G. NAND gate N 50 will have a 1 or 0 output level depending on whether the tone burst carrier frequency is greater or lesser than 4.5 KHz. NAND gates N 26 – N 31 and N 36 – N 50 provide decoding logic to generate a quantity $N_o$ which will be defined later. For example, if the initial frequency of the input pulse were 3.45 KHz, then the count in the initial register will be 725 which in binary form is 1011010101. This frequency is in the interval 3.4 – 3.5 KHz listed in the table and requires that $N_o = 100$. The four most significant bits (1011) are common for all frequencies in this interval and are decoded by the NAND gates into 1100100 which is 100 in binary form. A similar decoding is performed in each interval by the decoding NAND gates.

At the end of an input signal a start signal is generated by associated equipment not shown and applied to lines L 15 and L 16 (FIG. 3). NAND gate N 32 feeds an output signal through NAND gates N 52 and N 55 back to the apparatus of FIG. 2, causing a transfer of the contents of initial register 9 to slave register 25. The effect is to replace the count in 25 with the count in register 9. In the C.W. case the count in slave register 25 will not change.

The count stored in register 25 is compared with the count in a counter 18 in a comparator 17. Counter 18 counts the 5 MHz frequency from clock 22b received over a line L 6. When the count in 18 equals the count stored in slave register 25, comparator 17 generates an output signal which passes gates N 11 and N 12 and is applied over line L 18 to reset counter 18. The signal from comparator 17 is also applied to toggle flipflop FF 1, which develops an output square wave signal. Since the count stored in register 25 is equal to the number of 400 nanosecond intervals in a tone burst carrier period, the output signal from FF 1 is a square wave of the same frequency as the carrier.

A "slide" in the output frequency of the apparatus is generated by adding or subtracting counts to or from the slave register 25 to change the period of the output signal from FF 1. The period rate generator 26 senses the input frequency and develops outputs which are applied to comparator 23 over the lines shown in FIG. 3. A counter 27 is pulsed until the count stored therein equals the number applied to comparator 23. Comparator 23 then generates an output signal which passes through gate N 54 and line L 17 to clear counter 27. The output signal is developed at a rate $f_r/N_o$ (which will be defined presently) and fed back through N 57, line L 18 to N 24 and N 25. If a slide is present, one of the gates (N 24, N 25) will pass this output pulse to the proper input of slave register 25 through leads A and B to change the count therein. If no slide is present, both gates will be closed. This depends on the states of FF 16 and FF 17.

A slide length generator 30 comprised of one-shot multivibrators MV 1, MV 2, MV 3, MV 4, and NAND gates N 53 and N 56, determines whether the slide length is 500 ms or 160 ms. The start pulse enables two one-shot delay circuits comprising MV 1 and MV 2 for a 160 ms delay and MV 3 and MV 4 for a 500 ms delay. The period rate generator gates a pulse output from one or the other through gates B 53 or B 56, depending on whether the input frequency is above or below 4.5 KHz. This pulse is fed back over lead C to transfer the count in the initial register 9 to slave register 25.

The circuit elements shown in the preferred embodiment are known commercially available elements and their assembly to build the invention will be obvious to those skilled in the art. Other type elements may be used. The elements shown are available from Data Technology Corporation, Palo Alto, California. NAND gates shown are DTC elements Nos. 502, 503, and 504. Flipflops shown are DTC No. 511. Registers 9 and 25 and counter 18 are DTC No. 5524. Comparators 17, 22, and 26 are DTC No. 5586. Counter 27 may comprise a chain of DTC No. 511 flipflops. One-shot multivibrators are DTC No. 546A. The element labeled "strobe" in FIG. 1 is a transfer mechanism peculiar to the circuit elements used. Pull up resistors are used where higher speed is required.

The embodiment shown by way of example is simplified by considering only two frequency cases wherein one case considers carrier frequencies below 4.5 KHz and the other case considers frequencies above 4.5 KHz. Only two slides are generated, one being a 100 Hz up or down slide occurring in 0.5 sec and the second being a 440 Hz slide occurring in 0.16 sec. However the invention is not so limited and other applications requiring expanded capabilities are encompassed by the principles of the invention.

To recapitulate, an incoming tone burst signal having a carrier frequency which may be frequency modulated is detected. A first pulse isolator circuit generates an output signal having a duration equal to the period of a cycle of the carrier frequency at the beginning of the tone burst. A second pulse isolator circuit generates an output signal having a duration equal to the period of a carrier frequency cycle 100 ms later. The pulse isolator circuit outputs gate a clock pulse train into two respective registers. Then the counts stored in the registers indicate the frequency of the carrier signal and a comparison of the stored counts determines the presence or absence of FM and whether any FM present represents an up slide or a down slide. The apparatus generates a square wave output signal having a frequency equal to the detected carrier frequency. Means are provided to generate an up slide or a down slide in the square wave output signal.

The basis for determining $N_o$ is as follows:

1. $Ni$ = Count in the initial register
2. $N_f$ = Final count in the slave register
3. $Ti$ = Initial period
4. $T_f$ = Final period
5. $PW$ = Tone burst pulse width
6. $f_i$ = Initial frequency
7. $\Delta f$ = Slide modulation
8. $f_c$ = Clock frequency
9. $f_r$ = Period rate clock frequency
10. $f_s$ = Period rate frequency $Ti = 1/f_i$ $Ni = f_c\ Ti = f_c/f_i$ $$T_f = 1/f_i + \Delta f \qquad \text{up slide} \qquad (1)$$

$$N_f = f_c T_f = f_c/f_i + \Delta f$$

$$\Delta N = Ni - N_f = f_c\ \Delta f/f_i\ (f_i + \Delta f) \qquad (2)$$

Equation (2) determines the number of 400 ns intervals to be added to the slave register to generate the slide. This also gives us the frequency dependence of the equation. The rate at which the increments are to be added is:

$$f_s = \mp \Delta N/PW$$

$f_s$ is generated by dividing a clock frequency $f_r$ by some interger, $N_o$ where $N_o = f_r/f_s = f_r\ PW/\Delta N$ $N_o$ is dependent on frequency.

The frequency range considered is divided into 100 Hz intervals and a specific $N_o$ is assigned to each interval. This is a piecewise linear approach. For certain ranges the interval is 440 Hz.

| Interval KHz | N | PW Sec | $f_s$ | $N_o$ |
|---|---|---|---|---|
| 3.0–3.1 | 27 | 0.5 | 54 | 74 |
| 3.1–3.2 | 25 | 0.5 | 50 | 80 |
| 3.2–3.3 | 22 | 0.5 | 44 | 91 |
| 3.3–3.4 | 22 | 0.5 | 44 | 91 |
| 3.4–3.5 | 20 | 0.5 | 40 | 100 |
| 3.5–3.6 | 20 | 0.5 | 40 | 100 |
| 3.6–3.7 | 20 | 0.5 | 40 | 100 |
| 3.7–3.8 | 18 | 0.5 | 36 | 111 |
| 3.8–3.9 | 18 | 0.5 | 36 | 111 |
| 3.9–4.0 | 15 | 0.5 | 30 | 133 |
| 4.28–4.72 | 54 | 0.16 | 200 | 20 |
| 5.28–5.72 | 32 | 0.16 | 338 | 12 |

$f_r$=4KHz
$f_c$=2.5 MHz

From this table, knowing the interval, $N_o$ can be generated.

What is claimed is:

1. In apparatus for detecting and reproducing the carrier frequency of a tone burst signal the improvement comprising:

a first pulse isolator circuit connected to receive said tone burst signal for developing a first isolator pulse with the duration of a first cycle of said tone burst carrier frequency, gated delay circuit means and a second pulse isolator circuit connected through said gated delay circuit means to receive a delayed portion of said tone burst signal for developing a second isolator pulse with the duration of a later cycle of said tone burst carrier frequency, measuring means connected to said pulse isolator circuits for measuring the time duration of said first pulse and said later pulse, comparator means connected to said measuring means for comparing a measurement of said first pulse with a measurement of said second pulse, and output pulse generating means connected to said comparator means for generating an output pulse train having the frequency of said carrier frequency of said tone burst signal.

2. The apparatus of claim 1, said measuring means comprising:

an initial register, a slave register, a clock circuit for generating a clock frequency, and gating means responsive to said first isolator pulse for gating said clock frequency into said initial register and responsive to said second isolator pulse for gating said clock frequency into said slave register.

3. The apparatus of claim 2, said comparing means comprising:

a first comparator connected to said initial register and to said slave register for comparing a count stored in said initial register with a count stored in said slave register, a resettable counter connected to said clock circuit, and a second comparator connected to said slave register and to said counter for comparing a count stored in said slave register with a stored count of said clock frequency and generating an output pulse when said counts are equal.

4. The apparatus of claim 3, and including:

an up slide, down slide, or continuous wave detector for detecting the presence of frequency modulation of said tone burst carrier frequency.

5. The apparatus of claim 4 and including:

a feedback line connecting the output of said second comparator to the reset input of said counter for storing said clock frequency to reset said counter when an output pulse is generated by said second comparator, and a flipflop connected to the output of said second comparator to generate a system output pulse in response to every alternate second comparator output pulse.

6. The apparatus of claim 5 and including:

a decoder connected to said initial register to sense tone burst carrier frequency and to generate an integer $N_o$ as a function of frequency, and a scan pulse generator incorporating an additional counter and comparator connected to said second pulse isolator circuit to generate timing pulses to add or subtract from said slave register and thus generate a frequency modulated slide.

* * * * *